US010990111B2

(12) United States Patent
Lee et al.

(10) Patent No.: US 10,990,111 B2
(45) Date of Patent: Apr. 27, 2021

(54) POSITION DETERMINATION APPARATUS AND METHOD FOR VEHICLE

(71) Applicant: HYUNDAI MOBIS CO., LTD., Seoul (KR)

(72) Inventors: Won Oh Lee, Yongin-si (KR); Je Seok Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 262 days.

(21) Appl. No.: 16/136,023

(22) Filed: Sep. 19, 2018

(65) Prior Publication Data
US 2019/0094883 A1    Mar. 28, 2019

(30) Foreign Application Priority Data

Sep. 22, 2017  (KR) .................... 10-2017-0122308
Sep. 22, 2017  (KR) .................... 10-2017-0122309

(51) Int. Cl.
*G05D 1/00*  (2006.01)
*G05D 1/02*  (2020.01)
(Continued)

(52) U.S. Cl.
CPC .......... *G05D 1/0278* (2013.01); *G01C 21/12* (2013.01); *G01C 21/30* (2013.01); *G01S 19/47* (2013.01);
(Continued)

(58) Field of Classification Search
CPC ...... G01C 21/12; G01C 21/30; G05D 1/0278; G05D 1/0212; G05D 1/0223;
(Continued)

(56) References Cited

U.S. PATENT DOCUMENTS 9,366,540 B2 * 6/2016 Chien ................... G01C 21/16
2008/0077326 A1 * 3/2008 Funk .................... G08B 25/016
701/500
(Continued)

FOREIGN PATENT DOCUMENTS

KR    10-1628427 B     6/2016
KR    10-2017-0098071 A  8/2017

OTHER PUBLICATIONS

Office Action of Korean Patent Application No. 10-2017-0122308—11 pages (dated Feb. 8, 2021).
(Continued)

*Primary Examiner* — Abby Y Lin
*Assistant Examiner* — John W Simcox
(74) *Attorney, Agent, or Firm* — Morgan, Lewis & Bockius LLP

(57) ABSTRACT

A position determination apparatus for a vehicle may include: a first sensing unit configured to sense driving state information of the vehicle; a GNSS module configured to acquire position data of the vehicle; a first core unit configured to generate a first driving trajectory of the vehicle based on the driving state information sensed by the first sensing unit, and estimate the current position of the vehicle based on the generated first driving trajectory; a second sensing unit configured to detect driving environment information of the vehicle; and a second core unit configured to generate a second driving trajectory of the vehicle, generate map matching data by performing map matching on the driving environment information sensed through the second sensing unit, and generate fused position determination information by fusing the position data received from the GNSS module, the second driving trajectory and the map matching data.

18 Claims, 13 Drawing Sheets

(51) Int. Cl.
  *G01C 21/30* (2006.01)
  *G01S 19/47* (2010.01)
  *G01C 21/12* (2006.01)
(52) U.S. Cl.
  CPC ......... *G05D 1/0212* (2013.01); *G05D 1/0223* (2013.01); *G05D 2201/0213* (2013.01)
(58) Field of Classification Search
  CPC . G05D 2201/0213; G01S 19/47; G01S 19/45; G01S 19/393
  See application file for complete search history.

(56) References Cited

U.S. PATENT DOCUMENTS

| | | | | |
|---|---|---|---|---|
| 2012/0290146 | A1* | 11/2012 | Dedes | G01C 21/3697 701/1 |
| 2014/0121962 | A1* | 5/2014 | Rao | G01C 21/18 701/500 |
| 2015/0286759 | A1* | 10/2015 | Rehtanz | G06F 30/367 703/18 |
| 2017/0010124 | A1* | 1/2017 | Reisman | G08G 1/0112 |
| 2017/0059326 | A1* | 3/2017 | Zhang | G06T 7/74 |
| 2017/0089722 | A1* | 3/2017 | Steinhardt | G01C 21/20 |
| 2017/0176595 | A1* | 6/2017 | McPeek | G01S 17/89 |

OTHER PUBLICATIONS

Office Action of Korean Patent Application No. 10-2017-0122309—11 pages (dated Feb. 8, 2021).

* cited by examiner

POSITION DETERMINATION APPARATUS AND METHOD FOR VEHICLE

CROSS-REFERENCES TO RELATED APPLICATIONS

The present application claims priority to Korean application numbers 10-2017-0122308 & 10-2017-0122309, filed on Sep. 22, 2017, which are incorporated by reference in their entirety.

BACKGROUND OF THE INVENTION

The present invention relates to a position determination apparatus and method for a vehicle, and more particularly, to an apparatus and method for determining the current position of an autonomous vehicle.

An autonomous vehicle refers to a vehicle which autonomously decides a drive path by recognizing the surrounding environment through an outside information sensing and processing function during driving, and independently drives using its power. Although a driver does not operate the steering wheel, accelerator pedal or brake, the autonomous vehicle can travel to the destination by itself, while preventing a collision with an obstacle on the drive path and adjusting the speed and driving direction depending on the shape of a road. For example, the autonomous vehicle can raise the speed on a straight road, or lower the speed on a curved road while changing the driving direction in response to the curvature of the road.

A position determination system applied to the autonomous vehicle determines the current position of the vehicle through GPS (Global Positioning System) data acquired during driving and sensor data acquired through sensors mounted on the vehicle, based on roadmap information constructed through GPS and various sensors such as a radar, lidar and camera. In order to secure the stability of autonomous driving, it is important to accurately determine the current position of the vehicle. For this operation, a DGPS (Differential GPS) or RTK-DGPS (Real Time Kinematic-DGPS) may be used to improve the position accuracy of the GPS. Furthermore, in order to correct an error of the GPS data, which inevitably occurs, a map matching technique for comparing a previously constructed roadmap and sensor data may be applied.

In such a position determination system applied to the autonomous vehicle, the position information of the vehicle has a direct influence on a control output of the vehicle at the current time. Therefore, the real-time performance and the stability of the position determination system must be guaranteed. In the related art, however, the position determination system must process a large amount of data such as data provided from various sensors, a high-definition map and GPS data. Therefore, the real-time performance of the position determination system and the stability of the position information output cycle may not be secured.

The related art of the present invention is disclosed in Korean Patent Publication No. 10-2017-0098071 published on Aug. 29, 2017.

SUMMARY OF THE INVENTION

Embodiments of the present invention are directed to a position determination apparatus and method for a vehicle, which can secure the real-time performance of a position determination system and the stability of a position information output cycle by preventing a reduction in position information accuracy of the position determination system which processes a large amount of data such as data provided from various sensors, a high-definition map and GPS data.

In one embodiment, a position determination apparatus for a vehicle may include: a first sensing unit configured to sense driving state information of the vehicle; a GNSS (Global Navigation Satellite System) module configured to acquire position data of the vehicle; a first core unit configured to generate a first driving trajectory of the vehicle based on the driving state information sensed by the first sensing unit, and estimate the current position of the vehicle based on the generated first driving trajectory; a second sensing unit configured to detect driving environment information of the vehicle; and a second core unit configured to generate a second driving trajectory of the vehicle, generate map matching data by performing map matching on the driving environment information sensed through the second sensing unit, and generate fused position determination information by fusing the position data received from the GNSS module, the second driving trajectory and the map matching data.

The first core unit may generate the first driving trajectory by accumulating DR data which are generated by performing DR (Dead Reckoning) on the driving state information sensed through the first sensing unit, and the second core unit may generate the second driving trajectory by accumulating the DR data received from the first core unit.

The first core unit may estimate the current position of the vehicle by correcting the fused position determination information generated through the second core unit, using the first driving trajectory.

The second sensing unit may include a plurality of sensors configured to sense the driving environment information of the vehicle, and the second core unit may generate the map matching data by performing map matching on the respective pieces of driving environment information sensed through the plurality of sensors.

The second core unit may asynchronously operate based on a preset local timer, and perform time synchronization on the map matching data in order to remove asynchronicity between the respective map matching data, determined through the local timer.

The second core unit may perform time synchronization on the map matching data based on the second driving trajectory, and generate the fused position determination information by fusing the position data, the second driving trajectory and the time-synchronized map matching data.

The second core unit may perform the map matching by performing time synchronization between the driving environment information and map data used for the map matching.

The second core unit may asynchronously operate based on a preset local timer, and perform time synchronization between the driving environment information and the map data in order to remove asynchronicity between the driving environment information and the map data, determined through the local timer. The second core unit may perform the time synchronization by synchronizing the driving environment information with the map data based on the second driving trajectory.

The first core unit may generate a real-time (RT) timer using the position data acquired through the GNSS module, and estimate the current position of the vehicle using the generated RT timer.

The first core unit may determine the time required until the fused position determination information is received from the second core unit, through the RT timer, and estimate the current position of the vehicle by compensating for an error of the fused position determination information using the first driving trajectory, the error being caused by time delay corresponding to the determined required time.

In another embodiment, a position determination method for a vehicle may include: generating, by a first core unit, a first driving trajectory of the vehicle, based on driving state information of the vehicle; generating, by a second core unit, a second driving trajectory of the vehicle, and generating map matching data by performing map matching on driving environment information of the vehicle; generating, by the second core unit, fused position determination information by fusing the second driving trajectory, the map mating data, and position data received from a GNSS module for acquiring the position data of the vehicle; and estimating, by the first core unit, the current position of the vehicle based on the first driving trajectory and the fused position determination information.

DESCRIPTION OF SPECIFIC EMBODIMENTS

Hereafter, a position determination apparatus and method for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
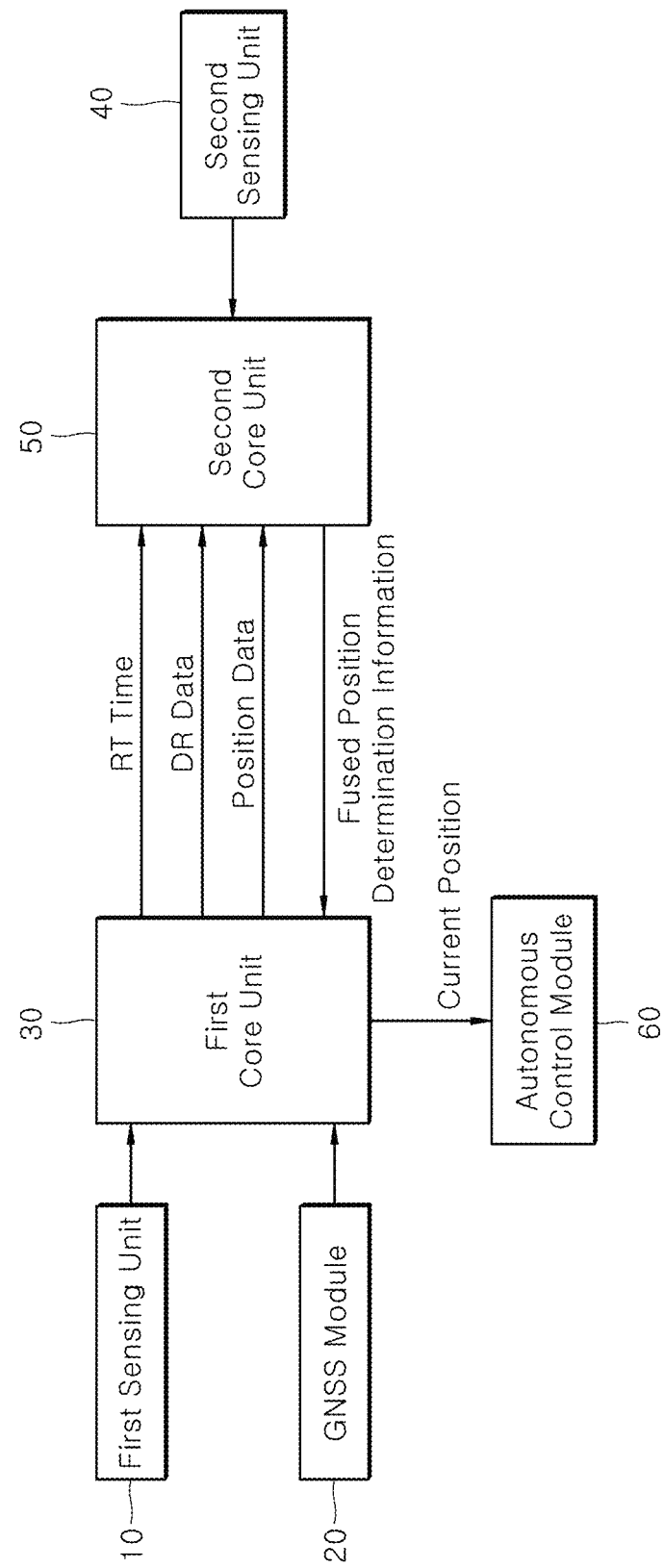
FIG. 1 is a block diagram illustrating a position determination apparatus for a vehicle in accordance with an embodiment of the present invention.
Figure 2:
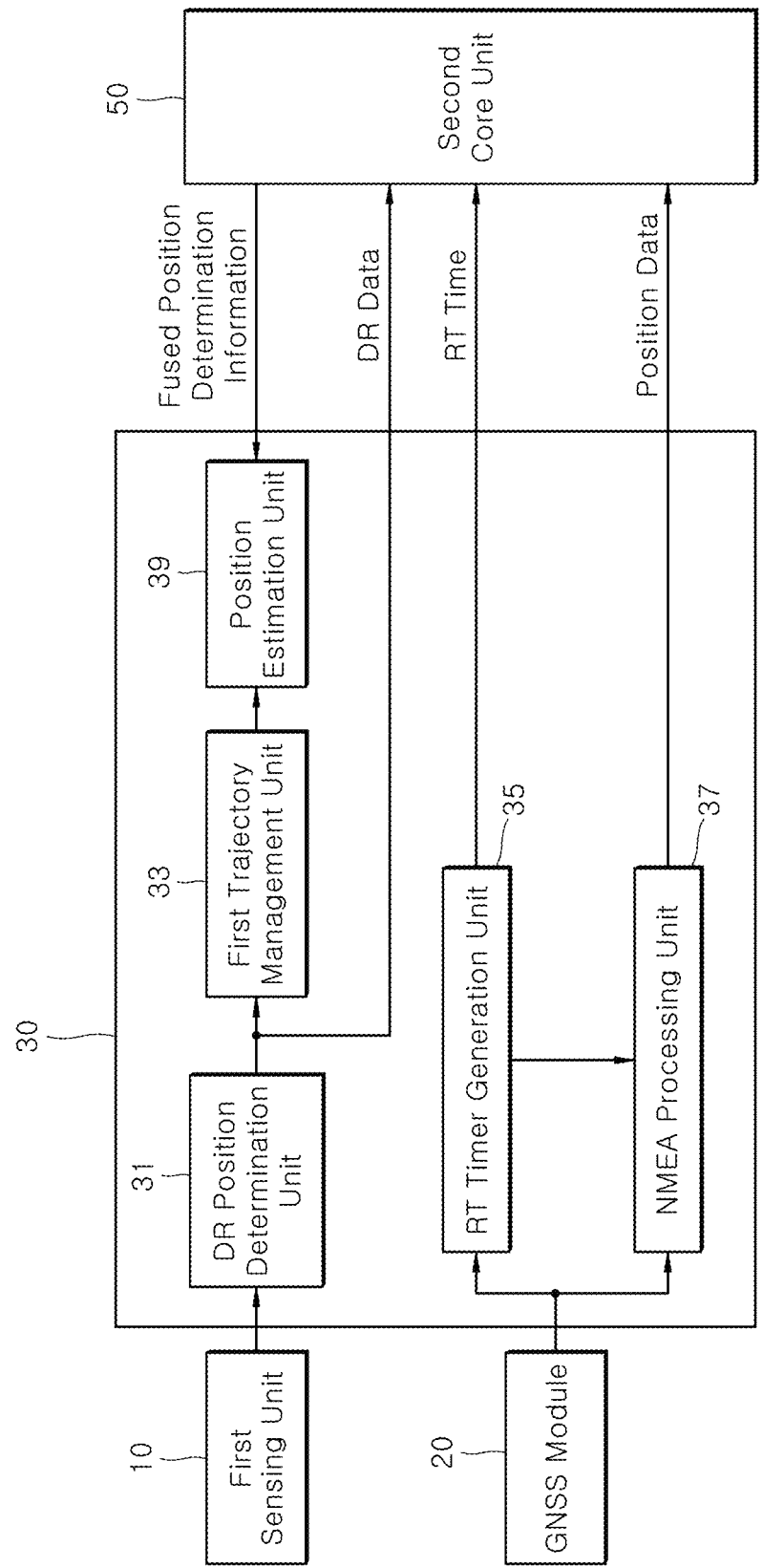
FIG. 2 is a block diagram illustrating the configuration of a first core unit in the position determination apparatus in accordance with the embodiment of the present invention.
Figure 3:
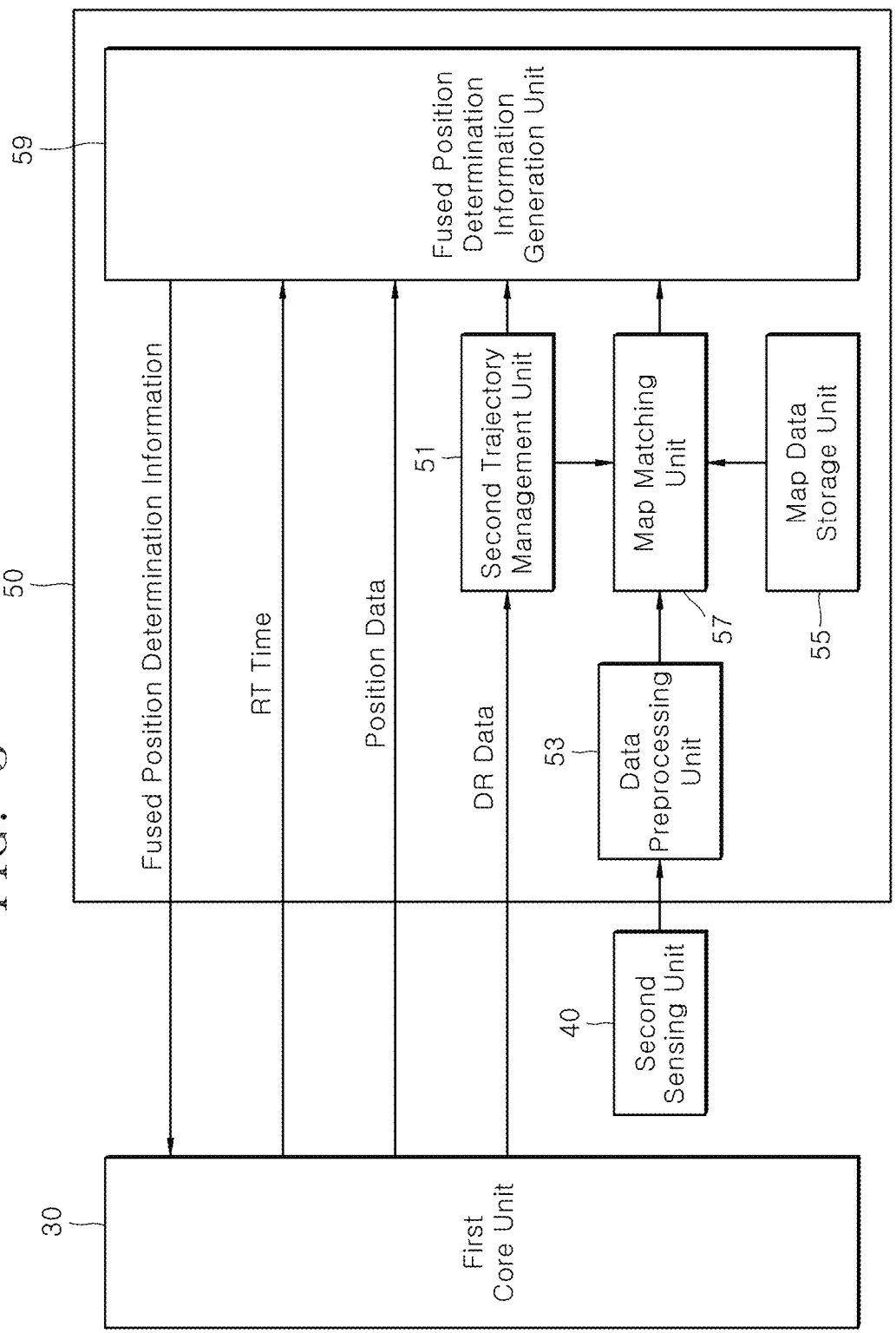
FIG. 3 is a block diagram illustrating the configuration of a second core unit in the position determination apparatus in accordance with the embodiment of the present invention.
Figure 4A:
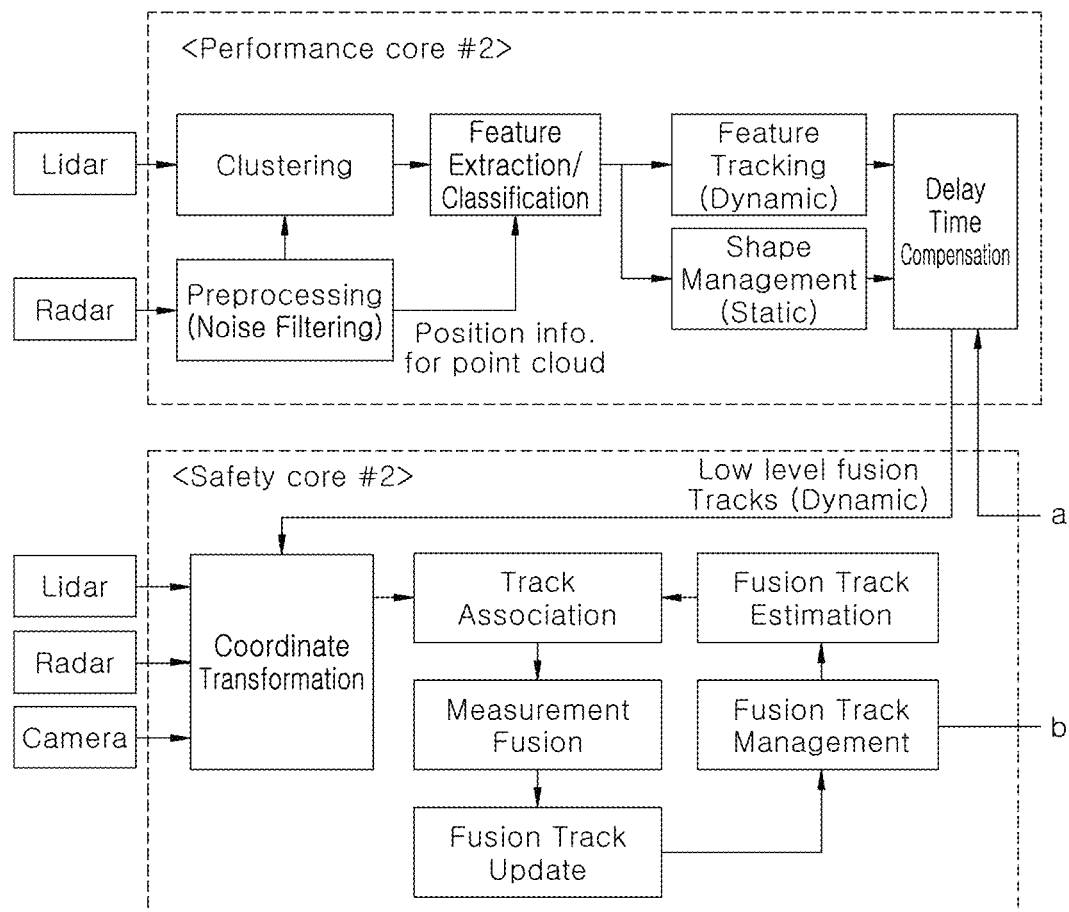
FIGS. 4A and 4B are block diagrams illustrating the entire system architecture of the position determination apparatus in accordance with the embodiment of the present invention.
Figure 4A:
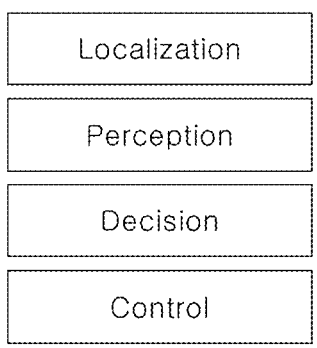
Figure 4B:
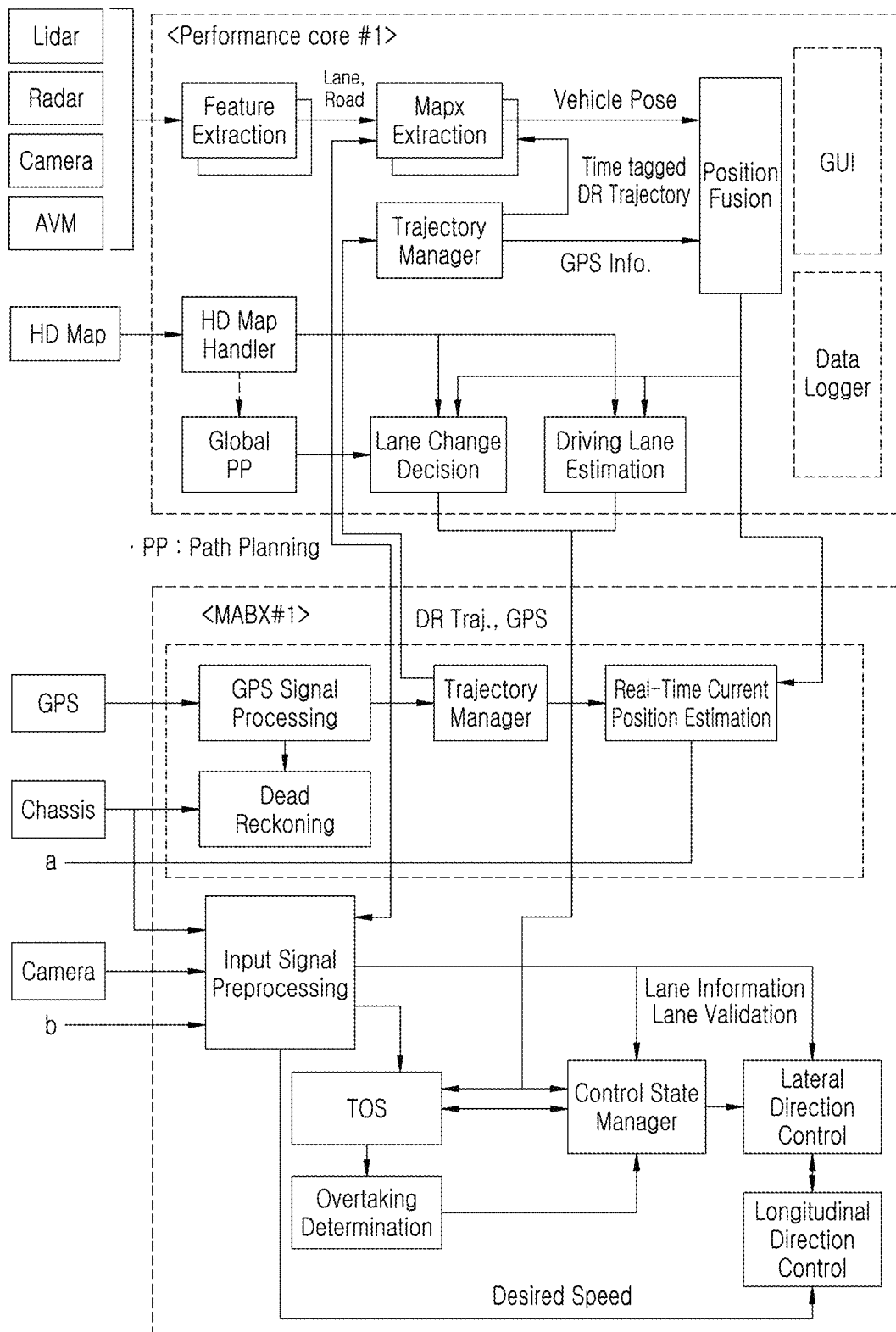
Figure 5:
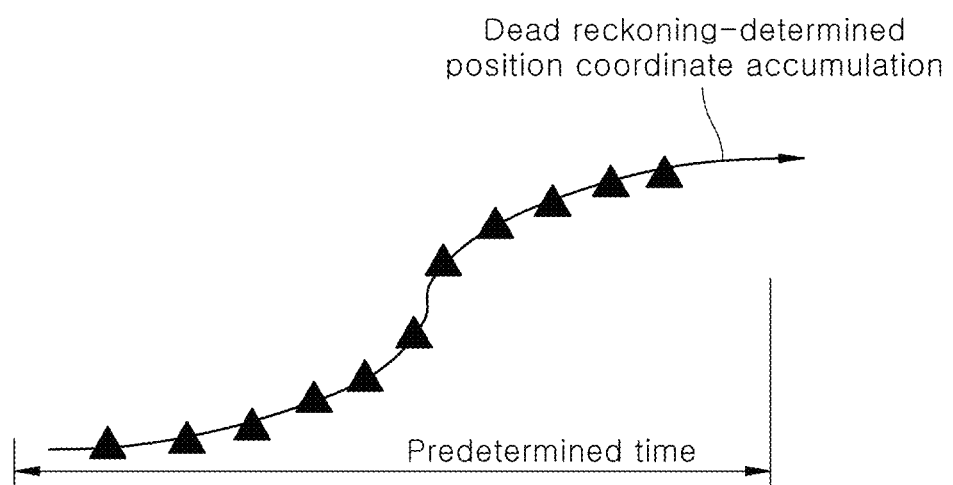
FIG. 5 illustrates a process in which first and second trajectory management units generate first and second trajectories by accumulating DR (Dead Reckoning) data in the position determination apparatus in accordance with the embodiment of the present invention.
Figure 6:
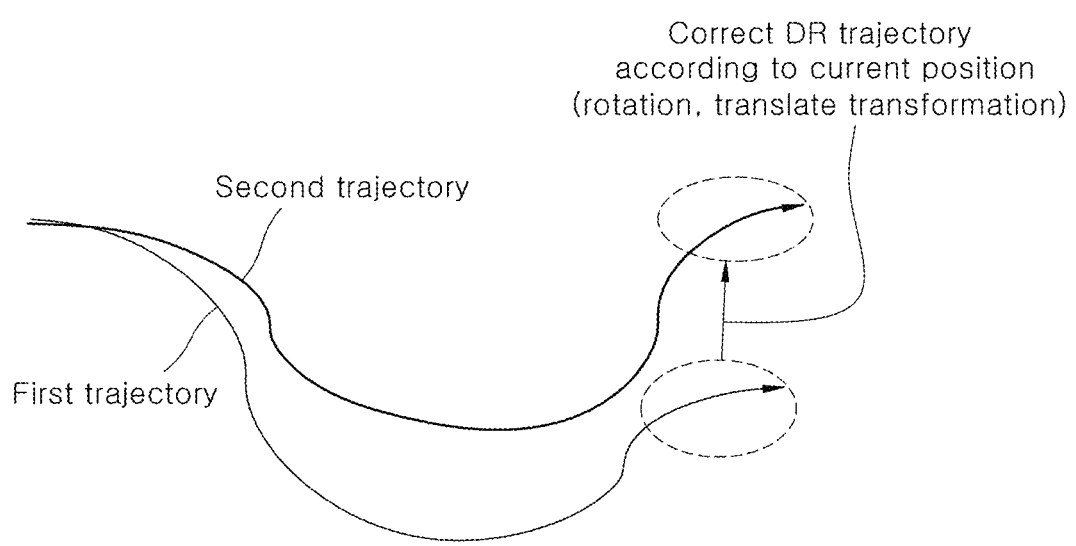
FIG. 6 illustrates a difference between the first and second trajectories in the position determination apparatus in accordance with the embodiment of the present invention.
Figure 7:
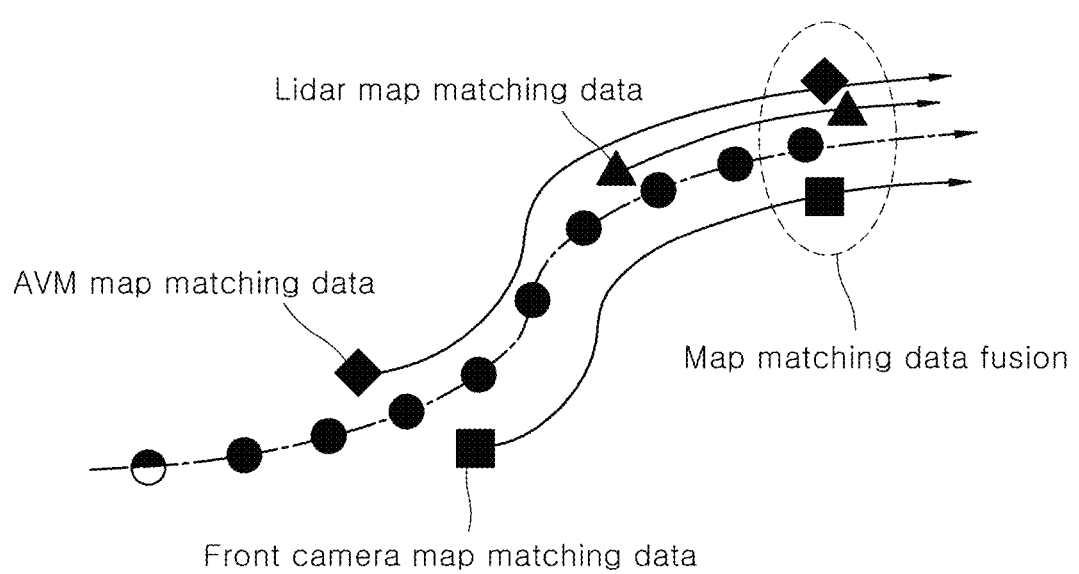
FIG. 7 illustrates a process in which the second core unit generates fused position determination information in a first embodiment of the position determination apparatus in accordance with the embodiment of the present invention.
Figure 8:
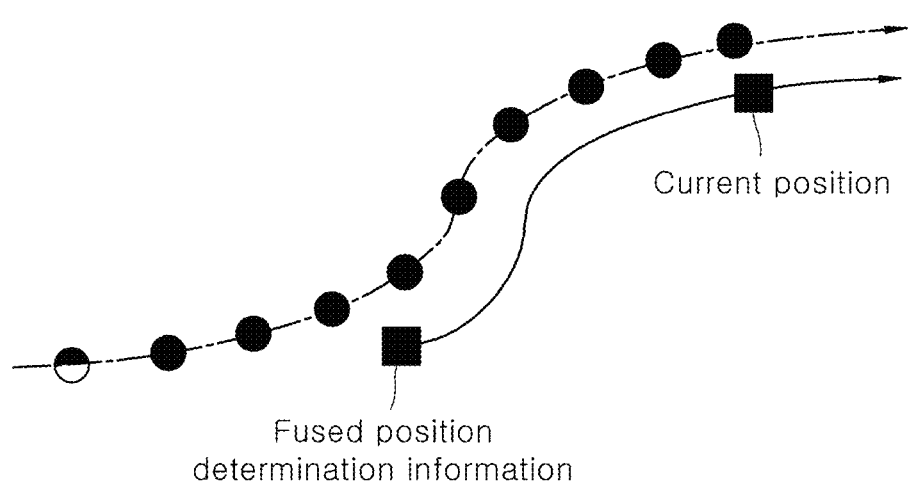
FIG. 8 illustrates a process in which the first core unit compensates for an error of fused position determination information in the first and second embodiments of the position determination apparatus in accordance with the embodiment of the present invention.
Figure 9:
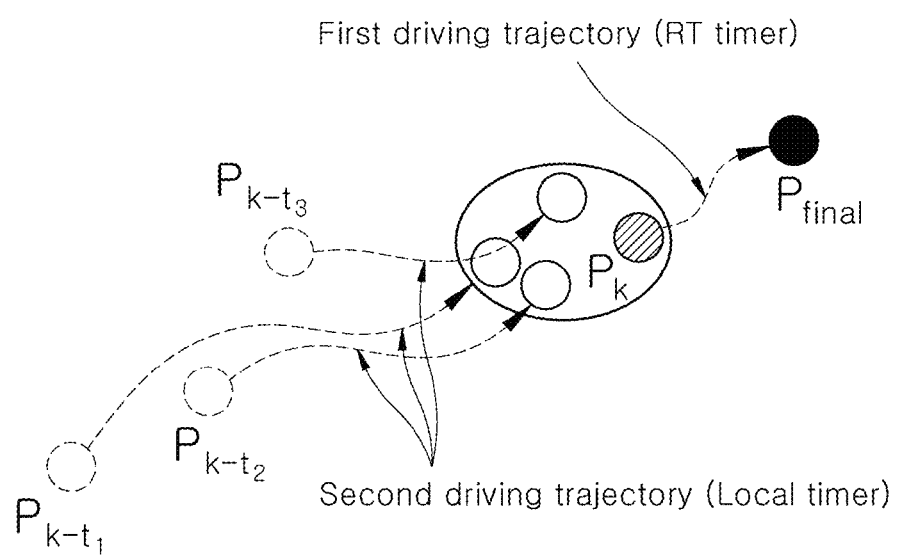
FIG. 9 illustrates a process in which the second core unit performs time synchronization and a process in which the first core unit compensates for an error of the fused position determination information, in the first embodiment of the position determination apparatus in accordance with the embodiment of the present invention.
Figure 10:
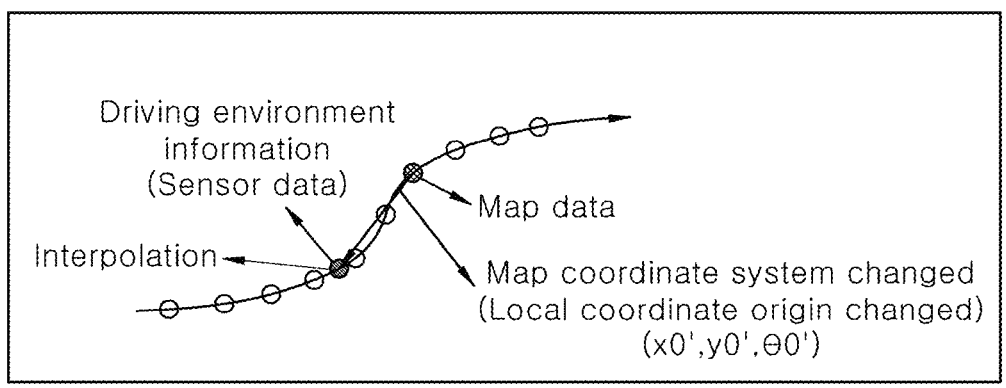
FIG. 10 illustrates a process in which the second core unit performs time synchronization between driving environment information and map data in the second embodiment of the position determination apparatus in accordance with the embodiment of the present invention.
Figure 11:
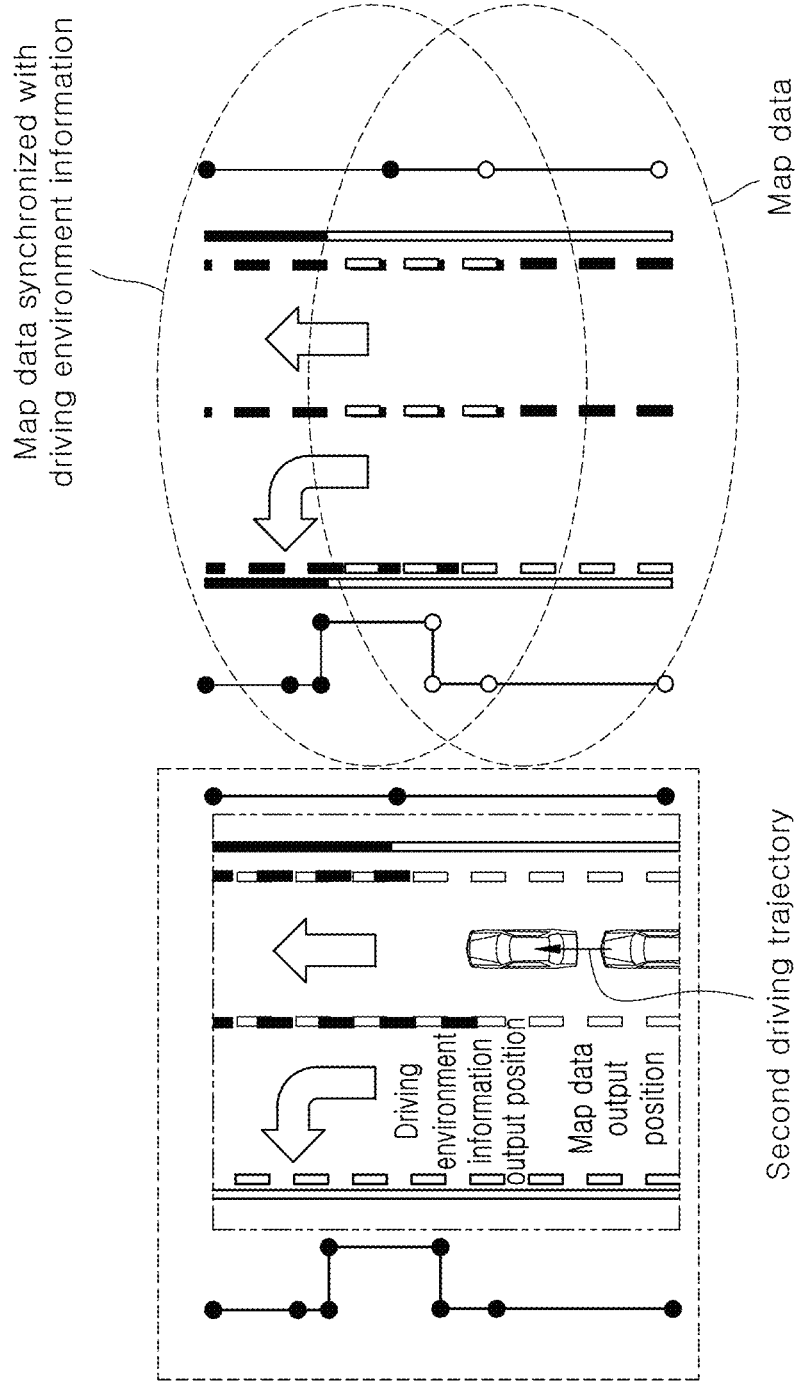
FIG. 11 illustrates a result obtained by performing time synchronization by synchronizing map data with driving environment information in the second embodiment of the position determination apparatus in accordance with the embodiment of the present invention.

FIG. 1 is a block diagram illustrating a position determination apparatus for a vehicle in accordance with an embodiment of the present invention, FIG. 2 is a block diagram illustrating the configuration of a first core unit in the position determination apparatus in accordance with the embodiment of the present invention, FIG. 3 is a block diagram illustrating the configuration of a second core unit in the position determination apparatus in accordance with the embodiment of the present invention, FIGS. 4A and 4B are block diagrams illustrating the entire system architecture of the position determination apparatus in accordance with the embodiment of the present invention, FIG. 5 illustrates a process in which first and second trajectory management units generate first and second trajectories by accumulating DR (Dead Reckoning) data in the position determination apparatus in accordance with the embodiment of the present invention, FIG. 6 illustrates a difference between the first and second trajectories in the position determination apparatus in accordance with the embodiment of the present invention, FIG. 7 illustrates a process in which the second core unit generates fused position determination information in a first embodiment of the position determination apparatus in accordance with the embodiment of the present invention, FIG. 8 illustrates a process in which the first core unit compensates for an error of fused position determination information in the first and second embodiments of the position determination apparatus in accordance with the embodiment of the present invention, FIG. 9 illustrates a process in which the second core unit performs time synchronization and a process in which the first core unit compensates for an error of the fused position determination information, in the first embodiment of the position determination apparatus in accordance with the embodiment of the present invention, FIG. 10 illustrates a process in which the second core unit performs time synchronization between driving environment information and map data in the second embodiment of the position determination apparatus in accordance with the embodiment of the present invention, and FIG. 11 illustrates a result obtained by performing time synchronization by synchronizing map data with driving environment information in the second embodiment of the position determination apparatus in accordance with the embodiment of the present invention.

Referring to FIG. 1, the position determination apparatus in accordance with the embodiment of the present invention may include a first sensing unit 10, a GNSS (Global Navigation Satellite System) module 20, a first core unit 30, a second sensing unit 40 and a second core unit 50.

The first sensing unit 10 may sense driving state information of a vehicle. The driving state information of the vehicle may include a yaw rate and steering angle for estimating the driving direction of the vehicle, and wheel speed and gear shift information for estimating the driving speed of the vehicle. In order to sense the driving state information, the first sensing unit 10 may include a yaw rate sensor, a steering angle sensor, a wheel speed sensor and a gear shift sensor, which are not illustrated. As described below, the driving state information sensed by the first sensing unit 10 may be used to generate a first driving trajectory by applying dead reckoning (DR).

The second sensing unit 40 may sense driving environment information of the vehicle. The second sensing unit 40 may include a plurality of sensors to sense the driving environment information of the vehicle, and the plurality of sensors may include a camera sensor and a lidar sensor, which are not illustrated, the camera sensor including an AVM camera, a front camera, a stereo camera and the like. As described below, the driving environment information sensed by the second sensing unit 40 may be used to generate map matching data by applying map matching.

The GNSS module 20 may receive the absolute coordinate of the vehicle through a satellite, based on GPS, DGPS, Network-RTK or the like. Based on the absolute coordinate of the vehicle, the GNSS module 20 may generate position data such as latitude longitude coordinates, direction, speed and quality, and transfer the position data to a real-time (RT) timer generation unit 35 of the first core unit 30 and a fused position determination information generation unit 59 of the second core unit 50. The position data from the GNSS module 20 may be standardized by an NMEA (National Marine Electronics Association) processing unit 37, and transferred to the fused position determination information generation unit 59 of the second core unit 50.

The first core unit 30 may generate a first driving trajectory of the vehicle based on the driving state information sensed by the first sensing unit 10, and estimate the current position of the vehicle based on the generated first driving trajectory. At this time, the first core unit 30 may estimate the current position of the vehicle by correcting fused position determination information generated through the second core unit 50, using the first driving trajectory. This process will be described in detail later.

The second core unit 50 may generate a second driving trajectory of the vehicle, generate map matching data by performing map matching on the driving environment information sensed by the second sensing unit 40, and generate the fused position determination information by fusing the second driving trajectory, the map matching data and the position data received from the GNSS module 20.

The characteristics of the configuration in accordance with the present embodiment, which is divided into the first and second core units 30 and 50, will be preferentially described.

In the present embodiment, data processing logic which is relatively simple and needs to guarantee the real-time performance and stability of a data processing operation may be implemented as the first core unit 30, and data processing logic which is relatively complex and does not need to guarantee the real-time performance of a data processing operation may be implemented as the second core unit 50.

The first core unit 30 may be configured as a hard real-time hardware platform such as a real-time ECU or micro autobox, of which the real-time performance and stability are verified. The first core unit 30 may include a dead reckoning function based on vehicle behavior and a current position estimation technique for providing the current position of the vehicle to an autonomous driving control module 60 applied to an autonomous vehicle. As described below, the first core unit 30 may operate in a predetermined cycle. That is, the first core unit 30 may operate according to a preset operating frequency.

The second core unit 50 may be configured as various high-performance autonomous platforms including a personal computer (PC), such as a hardware platform based on a CPU/GPU, and include a technique for processing sensor data from a sensor mounted on the vehicle, a map matching technique, and a fused position determination information generation technique which will be described later. As described later, the second core unit 50 may be asynchronously operated according to a FIFO (First In First Out), triggered or sampling method, based on a preset local timer. The second core unit 50 may perform time synchronization using the local timer.

In the present embodiment, the time synchronization may be divided into two cases below.

① The second core unit 50 may add time tags (hereafter, referred to as local time tags) to the respective pieces of driving environment information sensed by the second sensing unit 40, using the local timer. Since the respective pieces of driving environment information into which the local time tags are added have different pieces of time information, the time asynchronicity may be removed through the time synchronization by the second core unit 50. That is, time synchronization between map matching data may be achieved.

② The second core unit 50 may add local time tags to the map data used for map matching and the driving environment information sensed by the second sensing unit 40, using the local timer. Since the driving environment information and the map data into which the local time tags are added have different pieces of time information, the time asynchronicity may be removed through the time synchronization by the second core unit 50. That is, time synchronization between the driving environment information and the map data may be achieved.

The time synchronization of ① and ② will be described in detail later.

Based on the above-described configuration, the operations of the first and second core units 30 and 50 will be described in detail with reference to FIGS. 2 and 3.

Referring to FIG. 2, the first core unit 30 may include a DR position determination unit 31, a first trajectory management unit 33, an RT timer generation unit 35, an NMEA processing unit 37 and a position estimation unit 39.

The DR position determination unit 31 may perform DR on the driving state information sensed by the first sensing unit 10. The DR position determination unit 31 may estimate the driving direction of the vehicle from the yaw rate and the steering angle which are received from the yaw rate sensor and the steering angle sensor of the first sensing unit 10, estimate the driving speed of the vehicle from the wheel speed and the gear shift information which are received from the wheel speed sensor and the gear shift sensor, and perform DR using the estimated driving direction and driving speed. The DR position determination unit 31 may transfer DR data generated through the DR to the first trajectory management unit 33 and the second trajectory management unit 51 of the second core unit 50.

As illustrated in FIG. 5, the first trajectory management unit 33 may generate the first driving trajectory of the vehicle by accumulating the DR data received from the DR position determination unit 31, and transfer the first driving trajectory to the position estimation unit 39. As described later, the first driving trajectory may be used when the position estimation unit 39 compensates for an error of the fused position determination information received from the second core unit 50. The shorter the cumulative time of the DR data, the better the reliability or precision of the first driving trajectory.

The RT timer generation unit 35 may generate an RT timer using the position data acquired by the GNSS module 20. The RT timer may provide a reference time used for estimating the current position of the vehicle, and provide ms-based time to improve the reliability of the current position estimation of the vehicle. The RT timer generation unit 35 may generate the RT timer using a GPS pps (pulse per second) signal included in the position data acquired by the GNSS module 20. Hereafter, the time provided by the RT timer will be represented by RT time, for convenience of description. The RT timer generation unit 35 may transfer the RT time to the position estimation unit 39 and the fused position determination information generation unit 59 of the second core unit 50.

The position estimation unit 39 may finally estimate the current position of the vehicle, and provide the estimated position to the autonomous driving control module 60 applied to an autonomous vehicle. Therefore, the autonomous driving control module 60 may generate an autonomous drive path based on surrounding environment recognition data (surrounding vehicles, pedestrians or obstacles) acquired through sensors mounted on the vehicle (for example, the first and second sensing units 10 and 40) and the current position of the vehicle, received from the position estimation unit 39, and control the steering, braking and driving systems of the vehicle to follow the generated autonomous drive path.

As described later, the position estimation unit 39 may estimate the current position of the vehicle by compensating for an error using the first driving trajectory, the error being caused by time delay and included in the fused position determination information generated through the second core unit 50. This process will be described in detail later.

Referring to FIG. 3, the second core unit 50 may include a second trajectory management unit 51, a data preprocessing unit 53, a map data storage unit 55, a map matching unit 57 and a fused position determination information generation unit 59.

As illustrated in FIG. 5, the second trajectory management unit 51 may generate the second driving trajectory by accumulating the DR data received from the DR position determination unit 31 of the first core unit 30, and transfer the second driving trajectory to the map matching unit 57 and the fused position determination information generation unit 59. The first driving trajectory generated by the first trajectory management unit 33 of the first core unit 30 may have high accuracy when the DR data accumulation time is short, but cannot avoid accumulation of errors over time. Therefore, the first driving trajectory may be different from the current trajectory of the vehicle. That is, the first driving trajectory may have high reliability in terms of the operation of the first core unit 30, but cannot guarantee the reliability in terms of the operation of the second core unit 50, due to accumulation of errors over time. Therefore, the second trajectory management unit 51 may accumulate DR data which are received from the DR position determination unit 31 of the first core unit 30 separately from the first trajectory management unit 33, and separately generate the second driving trajectory distinguished from the first driving trajectory. FIG. 6 illustrates a difference between the first and second driving trajectories at a point of time that the second core unit 50 is operated.

The map matching unit 57 may generate map matching data by performing map matching on the driving environment information detected by the second sensing unit 40.

As described above, the time synchronization in accordance with the present embodiment may be divided into ① time synchronization between the map matching data and ② time synchronization between the driving environment information and the map data. Hereafter, two embodiments which are distinguished from each other depending on the type of the time synchronization will be described.

① First Embodiment: Time Synchronization Between Map Matching Data

The map matching unit 57 may perform map matching on the respective pieces of driving environment information sensed by the plurality of sensors included in the second sensing unit 40. The respective pieces of driving environment information may be preprocessed by the data preprocessing unit 53, and the map data required for map matching may be received from the map data storage unit 55. In the present embodiment, the map data used for map matching may include 3D high definition (HD) map data applied to an autonomous driving vehicle. However, the map data may not be limited thereto.

The map matching unit 57 may perform map matching on the driving environment information, using the second driving trajectory received from the second trajectory management unit 51 and the map data received from the map data storage unit 55. The map matching unit 57 may perform map matching using a data assignment algorithm such as an ICP (Iterative Closest Point), Hungarian auction or linear fitting algorithm, and map matching data generated through the map matching may be transferred to the fused position determination information generation unit 59.

The map matching data generated by the map matching unit 57 may include the local time tags having different pieces of time information, which are added by the second core unit 50 as described above. Thus, the second core unit 50 may perform time synchronization on the map matching data through the fused position determination information generation unit 59, in order to remove asynchronicity between the respective map matching data.

Specifically, the fused position determination information generation unit 59 may perform time synchronization on the map matching data, based on the second driving trajectory received from the second trajectory management unit 51. Referring to an example illustrated in FIG. 7, the fused position determination information generation unit 59 may perform time synchronization on the map matching data by applying the second driving trajectory to the respective map matching data for sensor data of a lidar sensor, an AVM camera sensor and a front camera sensor. Therefore, the fused position determination information generation unit 59 may generate fused position determination information (one position coordinate) by fusing the position data received from the GNSS module 20, the second driving trajectory received from the second trajectory management unit 51, and the time-synchronized map matching data. The fused position determination information generation unit 59 may fuse the position data, the second driving trajectory and the time-synchronized map matching data, using a fusion algorithm such as an EKF (Extended Kalman Filter) or weighted sum. The fused position determination information generation unit 59 may add an RT time tag to the generated fused position determination information through the RT time received from the RT timer generation unit 35 of the first core unit 30, and transfer the resultant information to the position estimation unit 39 of the first core unit 30.

The position estimation unit 39 may estimate the current position of the vehicle by correcting the fused position determination information, using the first driving trajectory received from the first trajectory management unit 33. At this time, the position estimation unit 39 may determine the time required until the fused position determination information is received from the second core unit 50, through the RT timer, and estimate the current position of the vehicle by compensating for an error of the fused position determination information using the first driving trajectory, the error being caused by time delay corresponding to the determined required time.

Specifically, when the position estimation unit 39 estimates the current position of the vehicle, the fused position determination information received from the second core unit 50 may be already past data due to the computation time of the fused position determination information generation unit 59 and the communication time between the second core unit 50 and the first core unit 30. Therefore, it is necessary to compensate for an error of the fused position determination information, caused by the time delay.

Therefore, the position estimation unit 39 may determine the time required until the fused position determination information is received from the second core unit 50, through the RT time tag included in the fused position determination information received from the second core unit 50 and the RT time provided through the RT timer, the required time including the computation time of the fused position determination information generation unit 59 and the communication time between the second core unit 50 and the first core unit 30. Then, the position estimation unit 39 may estimate the current position of the vehicle by compensating for an error of the fused position determination information using the first driving trajectory, the error being caused by time delay corresponding to the determined required time. FIG. 8 illustrates that the position estimation unit 39 compensates for an error of the fused position determination information.

The process of generating the fused position determination information through the fused position determination information generation unit 59 and the process of compensating for an error of the fused position determination information through the position estimation unit 39 may be summarized with reference to FIG. 9. The second core unit 50 may add the local time tags to the respective pieces of driving environment information sensed through the plurality of sensors included in the second sensing unit 40. Thus, the map matching data $P_{k-t1}$, $P_{k-t2}$ and $P_{k-t3}$ generated by the map matching unit 57 may include the local time tags having different pieces of time information. The fused position determination information generation unit 59 may perform time synchronization on the map matching data through the second driving trajectory, generate the fused position determination information $P_k$ by fusing the position data, the second driving trajectory and the time-synchronized map matching data, add the RT time tag to the fused position determination information, and transfer the resultant information to the position estimation unit 39. The position estimation unit 39 may determine the time required until the fused position determination information is received from the second core unit 50, through the RT time tag included in the fused position determination information and the RT time provided through the RT timer, the required time including the computation time of the fused position determination information generation unit 59 and the communication time between the second core unit 50 and the first core unit 30. Then, the position estimation unit 39 may estimate the current position $P_{final}$ of the vehicle by compensating for an error of the fused position determination information using the first driving trajectory, the error being caused by time delay corresponding to the determined required time.

② Second Embodiment: Time Synchronization Between Driving Environment Information and Map Data The map matching unit 57 may generate map matching data by performing map matching on the driving environment information detected by the second sensing unit 40. The driving environment information may be preprocessed by the data preprocessing unit 53, and the map data required for map matching may be received from the map data storage unit 55. In the present embodiment, the map data used for map matching may include 3D HD-map data applied to an autonomous driving vehicle. However, the map data may not be limited thereto.

At this time, the driving environment information sensed by the second sensing unit 40 and the map data provided from the map data storage unit 55 may include local time tags which have different pieces of time information and are added by the second core unit 50. That is, since the driving environment information and the map data are inputted at different times, the driving environment information and the map data need to be time-synchronized with each other, in order to perform map matching between the driving environment information and the map data. Therefore, the map matching unit 57 may perform time synchronization between the driving environment information and the map data, in order to remove asynchronicity between the driving environment information and the map data, which is determined through the local timer or determined through the local time tags added to the driving environment information and the map data by the local timer.

As illustrated in FIG. 10, the map matching unit 57 may perform time synchronization by synchronizing the map data with the driving environment information based on the second driving trajectory. That is, the map matching unit 57 may perform time synchronization by synchronizing the map data with the driving environment information through coordinate transformation of the map data based on the local time tags included in the driving environment information. At this time, the movement of the vehicle depending on a time difference between the driving environment information and the map data may be compensated for through the second driving trajectory. FIG. 11 illustrates a result obtained by performing time synchronization by synchronizing the map data with the driving environment information.

The map matching unit 57 may perform map matching by performing time synchronization between the driving environment information and the map data through the above-described process. The map matching unit 57 may perform map matching using a data assignment algorithm such as an ICP, Hungarian auction or linear fitting algorithm, and map matching data generated through the map matching may be transferred to the fused position determination information generation unit 59.

The fused position determination information generation unit 59 may generate the fused position determination information by fusing the position data received from the GNSS module 20, the second driving trajectory received from the second trajectory management unit 51, and the map matching data received from the map matching unit 57. The fused position determination information generation unit 59 may fuse the position data, the second driving trajectory and the map matching data, using a fusion algorithm such as an EKF or weighted sum. The fused position determination information generation unit 59 may add the RT time tag to the generated fused position determination information through the RT time received from the RT timer generation unit 35 of the first core unit 30, and transfer the resultant information to the position estimation unit 39 of the first core unit 30.

The position estimation unit 39 may estimate the current position of the vehicle by correcting the fused position determination information, using the first driving trajectory received from the first trajectory management unit 33. At this time, the position estimation unit 39 may determine the time required until the fused position determination information is received from the second core unit 50 through the RT timer, and estimate the current position of the vehicle by compensating for an error of the fused position determination information using the first driving trajectory, the error being caused by time delay corresponding to the determined required time.

Specifically, when the position estimation unit 39 estimates the current position of the vehicle, the fused position determination information received from the second core unit 50 may be already past data due to the computation time of the fused position determination information generation unit 59 and the communication time between the second core unit 50 and the first core unit 30. Therefore, it is necessary to compensate for an error of the fused position determination information, caused by the time delay.

Therefore, the position estimation unit 39 may determine the time required until the fused position determination information is received from the second core unit 50, through the RT time tag included in the fused position determination information received from the second core unit 50 and the RT time provided through the RT timer, the required time including the computation time of the fused position determination information generation unit 59 and the communication time between the second core unit 50 and the first core unit 30. Then, the position estimation unit 39 may estimate the current position of the vehicle by compensating for an error of the fused position determination information using the first driving trajectory, the error being caused by time delay corresponding to the determined required time. FIG. 8 illustrates that the position estimation unit 39 compensates for an error of the fused position determination information.

Figure 12:
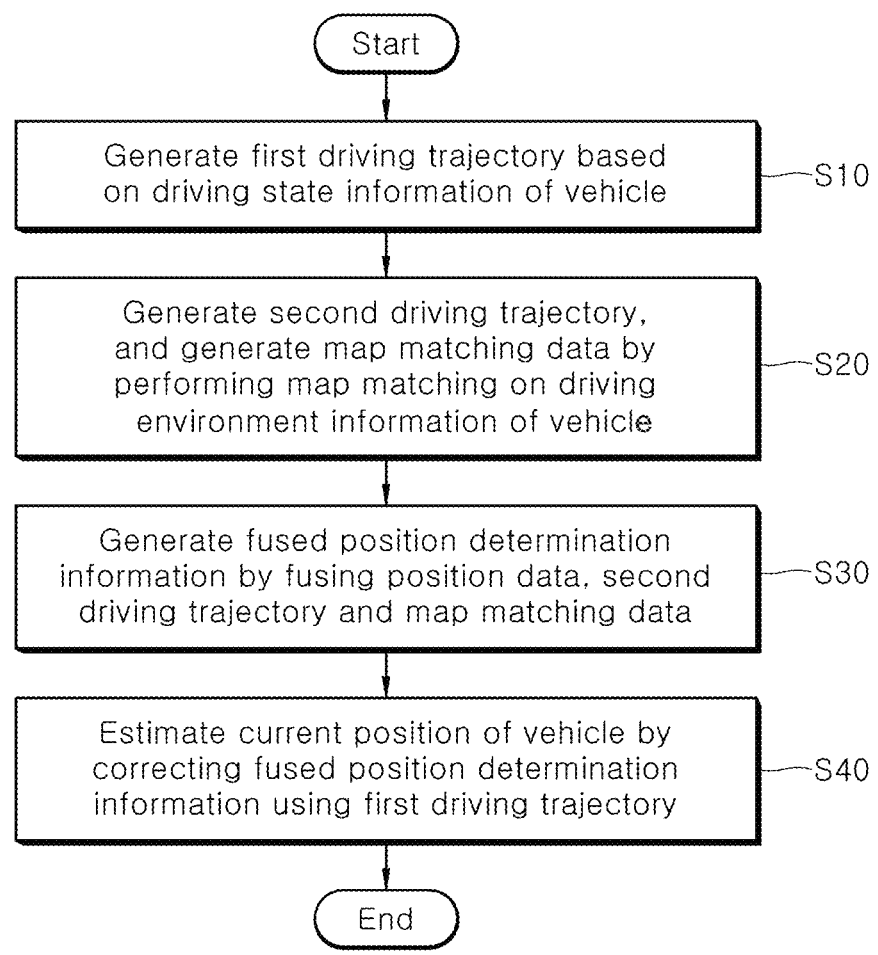
FIG. 12 is a flowchart illustrating a position determination method for a vehicle in accordance with an embodiment of the present invention.

FIG. 12 is a flowchart illustrating a position determination method for a vehicle in accordance with an embodiment of the present invention.

Referring to FIG. 12, the position determination method for a vehicle in accordance with the embodiment of the present invention may include: step S10 in which the first core unit generates a first driving trajectory of the vehicle based on driving state information of the vehicle; step S20 in which the second core unit generates a second driving trajectory of the vehicle and generates map matching data by performing map matching on driving environment information of the vehicle; step S30 in which the second core unit generates fused position determination information by fusing position data, the second driving trajectory and the map matching data, the position data being received from the GNSS module for acquiring the position data of the vehicle; and step S40 in which the first core unit estimates the current position of the vehicle based on the first driving trajectory and the fused position determination information.

As described above, the time synchronization in accordance with the embodiment of the present invention may be divided into ① time synchronization between the map matching data and ② time synchronization between the driving environment information and the map data. Hereafter, two embodiments which are distinguished from each other depending on the type of the time synchronization will be described.

① First Embodiment: Time Synchronization Between Map Matching Data

The first core unit 30 may generate a first driving trajectory of the vehicle based on driving state information of the vehicle at step S10. At step S10, the first core unit 30 may generate the first driving trajectory by accumulating DR data which are generated by performing DR on driving state information of the vehicle.

Then, the second core unit 50 may generate a second driving trajectory of the vehicle, and generate map matching data by performing map matching on the driving environment information of the vehicle, at step S20. At step S20, the second core unit 50 may generate the second driving trajectory by accumulating the DR data received from the first core unit 30, and generate the map matching data by performing map matching on the respective pieces of driving environment information sensed by the plurality of sensors mounted on the vehicle or included in the second sensing unit 40.

Then, the second core unit 50 may generate the fused position determination information by fusing the position data, the second driving trajectory and the map matching data, the position data being received from the GNSS module for acquiring the position data of the vehicle, at step S30. At step S30, the second core unit 50 may perform time synchronization on the map matching data, in order to remove asynchronicity between the respective map matching data, determined through the local timer. The second core unit 50 may perform time synchronization on the map matching data based on the second driving trajectory, and generate the fused position determination information by fusing the position data, the second driving trajectory and the time-synchronized map matching data.

Then, the first core unit 30 may estimate the current position of the vehicle based on the first driving trajectory and the fused position determination information, at step S40. At step S40, the first core unit 30 may estimate the current position of the vehicle by correcting the fused position determination information generated through the second core unit 50, using the first driving trajectory. The first core unit 30 may generate an RT timer using the position data acquired through the GNSS module 20, and estimate the current position of the vehicle using the generated RT timer. Specifically, the first core unit 30 may determine the time required until the fused position determination information is received from the second core unit 50, through the RT timer, and estimate the current position of the vehicle by compensating for an error of the fused position determination information using the first driving trajectory, the error being caused by time delay corresponding to the determined required time.

② Second Embodiment: Time Synchronization Between Driving Environment Information and Map Data The first core unit 30 may generate a first driving trajectory of the vehicle based on driving state information of the vehicle at step S10. At step S10, the first core unit 30 may generate the first driving trajectory by accumulating DR data which are generated by performing DR on the driving state information of the vehicle.

Then, the second core unit 50 may generate a second driving trajectory of the vehicle, and generate map matching data by performing map matching on driving environment information of the vehicle, at step S20. At step S20, the second core unit 50 may generate the second driving trajectory by accumulating the DR data received from the first core unit 30. The second core unit 50 may perform map matching by performing time synchronization between the driving environment information and the map data, in order to remove asynchronicity between the driving environment information and the map data, determined through the local timer. At this time, the second core unit 50 may perform time synchronization by synchronizing the driving environment information with the map data based on the second driving trajectory.

Then, the second core unit 50 may generate fused position determination information by fusing position data, the second driving trajectory and the map matching data, the position data being received from the GNSS module 20 for acquiring the position data of the vehicle, at step S30.

Then, the first core unit 30 may estimate the current position of the vehicle based on the first driving trajectory and the fused position determination information, at step S40. At step S40, the first core unit 30 may estimate the current position of the vehicle by correcting the fused position determination information generated through the second core unit 50, using the first driving trajectory. The first core unit 30 may generate an RT timer using the position data acquired through the GNSS module 20, and estimate the current position of the vehicle using the generated RT timer. Specifically, the first core unit 30 may determine the time required until the fused position determination information is received from the second core unit 50, through the RT timer, and estimate the current position of the vehicle by compensating for an error of the fused position determination information using the first driving trajectory, the error being caused by time delay corresponding to the determined required time.

In accordance with the embodiments of the present invention, the position determination apparatus and method can decide the architecture of the optimal system by considering whether data need to be processed in real time and require stability, secure the real-time performance and stability of the position determination system through the decided system architecture, thereby determining the current position of the vehicle with more precision.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A position determination apparatus for a vehicle, comprising:
   a first sensing unit configured to sense driving state information of the vehicle and comprising a plurality of vehicle motion sensors;
   a GNSS (Global Navigation Satellite System) module configured to acquire position data of the vehicle;
   a first core unit comprising a real-time hardware platform and configured to generate a first driving trajectory of the vehicle based on the driving state information sensed by the first sensing unit, and estimate current position of the vehicle;
   a second sensing unit configured to detect driving environment information of the vehicle which comprises information of features outside the vehicle, the second sensing unit comprising a plurality of environment detection sensors that comprises two or more of lidar sensors and camera sensors; and
   a second core unit connected to the first core unit to communicate with each other, comprising a CPU or GPU based computer hardware platform and configured to generate a second driving trajectory of the vehicle, generate map matching data by performing map matching on the driving environment information sensed through the second sensing unit, and generate fused position determination information by fusing the position data received from the GNSS module, the second driving trajectory and the map matching data,
   wherein the first core unit is configured to:
      process the driving state information acquired by the first sensing unit to estimate driving direction information and driving speed information and perform dead reckoning (DR) for generating DR data and further generating the first driving trajectory of the vehicle using the DR data; and
      transmit the DR data and the position data to the second core unit,
   wherein the second core unit is configured to:
      process the DR data received from the first core unit to generate the second driving trajectory of the vehicle;
      process the second driving trajectory, map data and the driving environment information to perform map matching and generate map matching data;
      process the second driving trajectory, the map matching data, and the position data to generate the fused position determination information; and
      transmit the fused position determination information to the first core unit,
   wherein the first core unit is further configured to:
      estimate transmission time taken for transmitting the fused position determination information from the second core unit to the first core unit; and
      process the fused position determination information, the first driving trajectory and the transmission time to estimate the current position of the vehicle.

2. The position determination apparatus of claim 1, wherein the first core unit generates the first driving trajectory by accumulating DR data, and
   the second core unit generates the second driving trajectory by accumulating the DR data received from the first core unit.

3. The position determination apparatus of claim 1, wherein the second core unit asynchronously operates based on a preset local timer, and performs time synchronization on the map matching data in order to remove asynchronicity between the respective map matching data, determined through the local timer.

4. The position determination apparatus of claim 3, wherein the second core unit performs time synchronization on the map matching data based on the second driving trajectory, and generates the fused position determination information by fusing the position data, the second driving trajectory and the time-synchronized map matching data.

5. The position determination apparatus of claim 1, wherein the second core unit performs the map matching by performing time synchronization between the driving environment information and the map data used for the map matching.

6. The position determination apparatus of claim 5, wherein the second core unit asynchronously operates based on a preset local timer, and performs time synchronization between the driving environment information and the map data in order to remove asynchronicity between the driving environment information and the map data, determined through the local timer, wherein the second core unit performs the time synchronization by synchronizing the driving environment information with the map data based on the second driving trajectory.

7. The position determination apparatus of claim 1, wherein the first core unit generates a real-time (RT) timer using the position data acquired through the GNSS module, and estimates the current position of the vehicle using the generated RT timer.

8. The position determination apparatus of claim 7, wherein the first core unit determines the transmission time required until the fused position determination information is received from the second core unit, through the RT timer.

9. A position determination method for a vehicle, comprising:
processing, by a first core unit installed in the vehicle and comprising a real-time hardware platform, driving state information acquired by a plurality of vehicle motion sensors to estimate driving direction information and driving speed information and perform dead reckoning (DR) for generating DR data and further generating a first driving trajectory of the vehicle using the DR data;
receiving, by the first core unit, position data acquired by a Global Navigation Satellite System (GNSS) module;
transmitting the DR data and the position data from the first core unit to a second core unit installed in the vehicle and comprising a CPU or GPU based computer hardware platform;
processing, by the second core unit, the DR data received from the first core unit to generate a second driving trajectory of the vehicle;
receiving, by the second core unit, driving environment information which comprises information of features outside the vehicle acquired by a plurality of environment detection sensors comprising two or more of lidar sensors and camera sensors;
processing, by the second core unit, the second driving trajectory, map data and the driving environment information for performing map matching to generate map matching data;
processing, by the second core unit, the second driving trajectory, the map matching data, and the position data to generate fused position determination information;
transmitting the fused position determination information from the second core unit to the first core unit;
estimating, by the first core unit, transmission time taken for transmitting the fused position determination information from the second core unit to the first core unit; and
processing, by the first core unit, the fused position determination information, the first driving trajectory and the transmission time to estimate current position of the vehicle.

10. The position determination method of claim 9, wherein in the generating of the first driving trajectory,
the first core unit generates the first driving trajectory by accumulating the DR data which are generated by performing DR on the driving state information, and wherein in the generating of the second driving trajectory and the map matching data,
the second core unit generates the second driving trajectory by accumulating the DR data received from the first core unit.

11. The position determination method of claim 9, wherein the second core unit asynchronously operates based on a preset local timer, and
wherein in the generating of the fused position determination information,
the second core unit performs time synchronization on the map matching data in order to remove asynchronicity between the respective map matching data, determined through the local timer.

12. The position determination method of claim 11, wherein in the generating of the fused position determination information,
the second core unit performs time synchronization on the map matching data based on the second driving trajectory, and generates the fused position determination information by fusing the position data, the second driving trajectory and the time-synchronized map matching data.

13. The position determination method of claim 9, wherein in generating of the second driving trajectory and the map matching data,
the second core unit performs the map matching by performing time synchronization between the driving environment information and map data used for the map matching.

14. The position determination method of claim 13, wherein the second core unit asynchronously operates based on a preset local timer, and
wherein in the generating of the second driving trajectory and the map matching data,
the second core unit performs time synchronization between the driving environment information and the map data in order to remove asynchronicity between the driving environment information and the map data, determined through the local timer, wherein the second core unit performs the time synchronization by synchronizing the driving environment information with the map data based on the second driving trajectory.

15. The position determination method of claim 9, wherein in the estimating of the current position of the vehicle,
the first core unit generates an RT timer using the position data acquired through the GNSS module, and estimates the current position of the vehicle using the generated RT timer.

16. The position determination method of claim 15, wherein in the estimating of the current position of the vehicle,
the first core unit determines the transmission time required until the fused position determination information is received from the second core unit, through the RT timer.

17. The position determination apparatus of claim 1, wherein the driving state information comprising a yaw rate, a steering angle, wheel speed information and gear shift information.

18. The position determination method of claim 9, wherein the driving state information comprising a yaw rate, a steering angle, wheel speed information and gear shift information.

* * * * *